(12) United States Patent
Namuduri et al.

(10) Patent No.: US 7,225,905 B2
(45) Date of Patent: Jun. 5, 2007

(54) MAGNETORHEOLOGICAL FLUID DAMPER

(75) Inventors: Chandra Sekhar Namuduri, Troy, MI (US); Alan Lampe Browne, Grosse Pointe, MI (US); Nancy L. Johnson, Northville, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/691,091

(22) Filed: Oct. 22, 2003

(65) Prior Publication Data

US 2005/0087408 A1  Apr. 28, 2005

(51) Int. Cl.
*F16F 13/30* (2006.01)

(52) U.S. Cl. .................... 188/267.1; 188/322.5

(58) Field of Classification Search ........... 188/266, 188/267, 267.1, 267.2, 322.5
See application file for complete search history.

(56) References Cited

U.S. PATENT DOCUMENTS

| | | | | |
|---|---|---|---|---|
| 2,856,179 A | * | 10/1958 | Hogan ..................... 188/129 |
| 3,834,283 A | * | 9/1974 | Beichel et al. ............. 92/33 |
| 4,226,168 A | * | 10/1980 | Staltmeir et al. ......... 92/130 A |
| 4,351,515 A | | 9/1982 | Yoshida |
| 4,544,047 A | * | 10/1985 | Clemmons et al. ......... 188/170 |
| 4,673,067 A | | 6/1987 | Munning et al. |
| 4,679,775 A | | 7/1987 | Funaki |
| 4,896,754 A | * | 1/1990 | Carlson et al. ............ 192/21.5 |
| 4,925,409 A | * | 5/1990 | Johnson ..................... 440/52 |
| 4,938,322 A | * | 7/1990 | Sugasawara et al. ........ 188/290 |
| 4,942,947 A | | 7/1990 | Shtarkman |
| 5,018,606 A | | 5/1991 | Carlson |
| 5,099,884 A | | 3/1992 | Monahan |
| 5,336,048 A | | 8/1994 | Ganzon et al. |
| 5,492,312 A | | 2/1996 | Carlson |
| 5,525,249 A | | 6/1996 | Kordonsky et al. |
| 5,573,088 A | | 11/1996 | Daniels |
| 5,819,632 A | * | 10/1998 | Moody ....................... 91/519 |
| 5,900,184 A | * | 5/1999 | Weiss et al. ............. 252/62.52 |
| 5,944,151 A | | 8/1999 | Jakobs et al. |
| 5,944,152 A | * | 8/1999 | Lindsay et al. ............. 188/296 |
| 5,947,238 A | | 9/1999 | Jolly et al. |
| 5,992,582 A | * | 11/1999 | Lou et al. ................ 188/267.1 |
| 6,095,486 A | | 8/2000 | Ivers et al. ............ 251/129.01 |

(Continued)

FOREIGN PATENT DOCUMENTS

GB  2384217  7/2003

*Primary Examiner*—Christopher P. Schwartz
(74) *Attorney, Agent, or Firm*—Kathryn A. Marra

(57) ABSTRACT

A magnetorheological damper device is provided having an increased shear interface area per unit volume of device, which enhances the stroking force of the damper. The damper generally includes a thrust shaft comprising an external threaded surface in threaded communication with a sealed housing, wherein at least one end of the thrust shaft extends from the housing; a plurality of rotors and stators alternatingly arranged in the housing, wherein the plurality of rotors comprise a planar surface with a centrally located aperture that is rotatably engaged with the threaded surface of the thrust shaft, wherein the plurality of stators is fixedly attached to the housing and comprises a centrally located aperture dimensioned to accommodate vertical movement of the thrust shaft and a planar surface substantially parallel to the planar surface of the at least one rotor, and wherein alternating stators comprises a permanent magnet or an electromagnet; and a magnetorheological fluid disposed in a space defined by the plurality of rotors and stators.

19 Claims, 3 Drawing Sheets

U.S. PATENT DOCUMENTS

| | | |
|---|---|---|
| 6,202,806 B1 | 3/2001 | Sandrin et al. |
| 6,260,675 B1 | 7/2001 | Muhlenkamp .............. 188/267 |
| 6,279,700 B1 | 8/2001 | Lisenker et al. ......... 188/267.1 |
| 6,279,701 B1 * | 8/2001 | Namuduri et al. ....... 188/267.2 |
| 6,302,249 B1 | 10/2001 | Jolly et al. |
| 6,327,024 B1 | 12/2001 | Hayashi et al. |
| 6,380,253 B1 | 4/2002 | Das |
| 6,394,239 B1 * | 5/2002 | Carlson .................... 188/267.2 |
| 6,427,813 B1 | 8/2002 | Carlson |
| 6,471,018 B1 * | 10/2002 | Gordaninejad et al. .. 188/267.1 |
| 6,481,659 B1 | 11/2002 | Ashtiani et al. ......... 242/379.1 |
| 6,571,161 B2 | 5/2003 | Browne et al. |
| 6,601,915 B2 | 8/2003 | Sullivan et al. .......... 297/216.1 |
| 6,681,905 B2 | 1/2004 | Edmondson et al. |
| 2001/0054527 A1 | 12/2001 | Card ....................... 188/267.1 |
| 2002/0113424 A1 | 8/2002 | Smith, Jr. et al. |
| 2002/0185347 A1 | 12/2002 | Pohl et al. |
| 2003/0001372 A1 | 1/2003 | Browne et al. |
| 2003/0113160 A1 | 6/2003 | Welch et al. |
| 2004/0173422 A1 | 9/2004 | Deshmukh et al. ...... 188/267.2 |
| 2004/0182661 A1 | 9/2004 | Lun ........................ 188/267.2 |
| 2005/0121269 A1 | 6/2005 | Namuduri et al. ....... 188/267.1 |

* cited by examiner

MAGNETORHEOLOGICAL FLUID DAMPER

BACKGROUND

This disclosure generally relates to a magnetorheological fluid damper and more particularly, to a magnetorheological fluid damper providing an increased shear interface area per unit volume of device.

Magnetorheological (MR) fluids belong to a class of controllable fluids. The essential characteristic of these fluids is their ability to reversibly change from a free-flowing, linear, viscous liquid to a semi-solid with controllable yield strength in milliseconds when exposed to a magnetic field. In the absence of an applied field, MR fluids are reasonably well approximated as Newtonian liquids.

A typical MR fluid has about 20 to about 40 percent by volume of relatively pure, soft iron particles, typically about 3 to about 5 microns, suspended in a carrier liquid such as mineral oil, synthetic oil, water, or glycol. A variety of proprietary additives similar to those found in commercial lubricants are commonly added to discourage gravitational settling and promote particle suspension, enhance lubricity, modify viscosity, and inhibit wear. The ultimate strength of the MR fluid depends on the square of the saturation magnetization of the suspended particles.

MR fluids made from iron particles typically exhibit maximum yield strengths of 30-90 kPa for applied magnetic fields of 150-250 kA/m (1 Oe. 80 A/m). MR fluids are not highly sensitive to moisture or other contaminants that might be encountered during manufacture and use. Furthermore, because the magnetic polarization mechanism is not affected by the surface chemistry of surfactants and additives, it is a relatively straightforward matter to stabilize MR fluids against particle-liquid separation in spite of the large density mismatch.

Most devices employ MR fluids in a valve mode, direct-shear mode, or combination of these two modes. Examples of valve mode devices include servovalves, dampers, and shock absorbers. Examples of direct-shear mode devices include clutches, brakes, and variable friction dampers. The maximum stroking force that an MR damper can provide generally depends on the MR fluid properties, the flow pattern, and the size of the damper.

However, the range of stroking forces achievable with current MR materials, flow patterns, and damper geometries are not sufficient for these devices to be practical for some applications such as, for example, in crash energy management applications. For these types of applications, an increased shear interface per unit volume of device is desirable since it directly increases the available stroking force.

BRIEF SUMMARY

Disclosed herein is a screw-type magnetorheological damper comprising a thrust shaft comprising an external threaded surface in threaded communication with a sealed housing, wherein at least one end of the thrust shaft extends from the housing; at least one rotor disposed in the housing comprising a planar surface with a centrally located aperture that is rotatably engaged with the threaded surface of the thrust shaft; at least one stator spaced apart from and adjacent to the at least one rotor, wherein the stator is fixedly attached to the housing and comprises a centrally located aperture dimensioned to accommodate vertical movement of the thrust shaft and a planar surface substantially parallel to the planar surface of the at least one rotor; a magnetorheological fluid disposed in a space defined by the at least one rotor and the at least one stator; and means for applying a substantially perpendicular magnetic field to the magnetorheological fluid relative to the planar surface of the at least one stator.

In another embodiment, the screw-type magnetorheological damper, comprises a thrust shaft comprising an external threaded surface in threaded communication with a sealed housing, wherein at least one end of the thrust shaft extends from the housing; a plurality of rotors and stators alternatingly arranged in the housing, wherein the plurality of rotors comprise a planar surface with a centrally located aperture that is rotatably engaged with the threaded surface of the thrust shaft, wherein the plurality of stators is fixedly attached to the housing and comprises a centrally located aperture dimensioned to accommodate vertical movement of the thrust shaft and a planar surface substantially parallel to the planar surface of the at least one rotor, and wherein alternating stators comprises a permanent magnet or an electromagnet; and a magnetorheological fluid disposed in a space defined by the plurality of rotors and stators.

A process for operating a screw-type magnetorheological damper for variably converting a linear force to a rotary force, comprises axially applying a force to a thrust shaft of a screw-type magnetorheological damper, wherein the screw-type magnetorheological damper comprises the thrust shaft having an external threaded surface in threaded communication with a sealed housing, at least one rotor disposed in the sealed housing comprising a planar surface with a centrally located aperture that is rotatably engaged with the threaded surface of the thrust shaft, at least one stator spaced apart from and adjacent to the at least one rotor, wherein the stator is fixedly attached to the housing and comprises a centrally located aperture dimensioned to accommodate vertical movement of the thrust shaft and a planar surface substantially parallel to the planar surface of the at least one rotor, and a magnetorheological fluid disposed in a space defined by the at least one rotor and the at least one stator; and variably applying a substantially perpendicular magnetic field to the magnetorheological fluid relative to the planar surface of the at least one stator so as to variably covert the linear force applied to the thrust shaft into the rotary force.

A magnetorheological damper, the damper comprising a cylindrically shaped housing; a magnetorheological fluid disposed in the cylindrically shaped housing; a piston assembly disposed within the cylindrically shaped housing in sliding engagement with the cylindrically shaped housing defining a first chamber and a second chamber, wherein the piston assembly comprises an annular starburst flow channel extending from the first chamber to the second chamber, and an electromagnet centrally disposed in the piston assembly; and a power supply in electrical communication with the electromagnet.

In another embodiment, the magnetorheological damper comprises a cylindrically shaped housing; a magnetorheological fluid disposed in the cylindrically shaped housing; a piston assembly disposed within the cylindrically shaped housing in sliding engagement with the cylindrically shaped housing defining a first chamber and a second chamber, wherein the piston assembly comprises a plurality of spiral shaped openings extending from the first chamber to the second chamber, and an electromagnet centrally disposed in the piston assembly; and a power supply in electrical communication with the electromagnet.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Disclosed herein is a magnetorheological fluid damper, also referred to herein as a MR damper. The MR damper is especially suitable for use in applications desiring damping control, and in a preferred embodiment, employs a design that provides an increase in the shear interface area per unit volume of device, which enhances the axial stroking force, thereby overcoming some of the problems noted in the prior art. It is known that a large turn-up ratio can be obtained with a reduction in off-state force and/or by improving/increasing the initial on-state force. The initial on-state force is generally dependent on the yield stress of the MR fluid, which is primarily dependent on the magnetic flux density in the fluid flow gaps. It has been discovered that by increasing the shear interface area per unit volume of device provided by the fluid passageways, a large turn-up ratio can be obtained.

Figure 1:
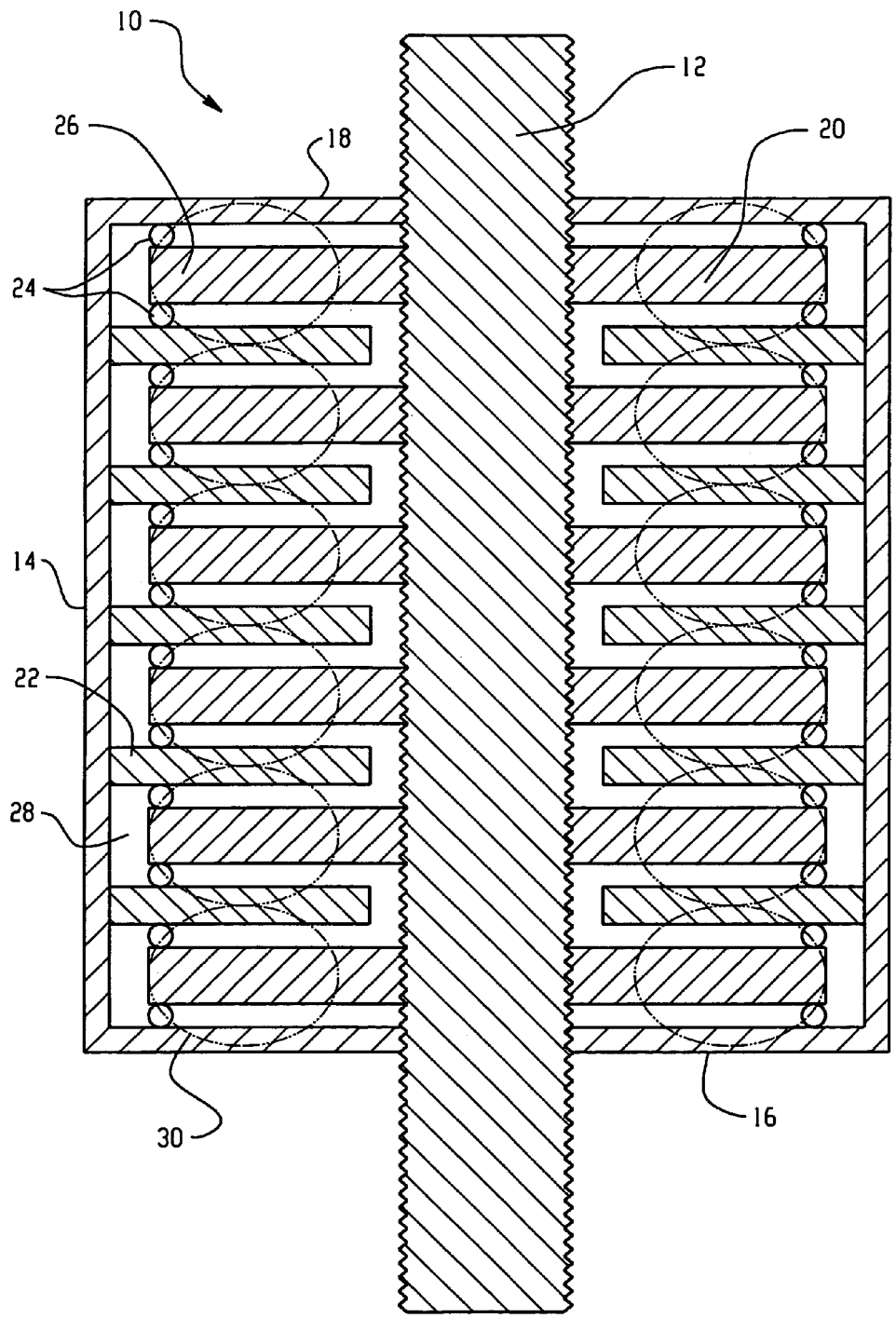
FIG. 1 is a cross sectional view of a magnetorheological damper.

FIG. 1 illustrates a cross section of a screw type magnetorheological (MR) fluid damper 10 having an increased shear interface area of fluid passageways per unit volume of device. The MR fluid damper 10 includes a threaded shaft 12 rotatably engageable within a cylindrically shaped housing 14 for converting linear motion to rotary motion. The pitch of shaft 12 is dependent on the intended application. Generally, the screw type MR fluid damper described herein is desirable for vertical loads requiring high resistance. The cylindrically shaped housing 14 is sealed at both ends with end caps 16, 18, wherein the threaded shaft is preferably centrally located within the housing 14.

A plurality of plates are disposed within the housing 14, wherein alternating plates 20, 22 are threadingly engaged with shaft 12 and fixedly attached to the housing 14, respectively. Those plates threadingly engaged with shaft 12 are referred to herein as rotors 20 whereas those plates fixedly attached to housing 14 are referred to as stators 22. Each rotor 20 is spaced apart from and substantially parallel to an adjacent stator 22. Alignment bearings 24 are disposed at the free end 26 of the rotor 20 to maintain horizontal alignment about a fixed plane during rotation of the rotors 20. Optionally, additional alignment bearings are disposed about the rotor to carry thrust loads and maintain clearances between the adjacent stator and the at least one rotor. For example, it may be desirable to have bearings in close proximity to shaft 12 to reduce the amount of torque and stress fatigue that may occur during rotation thereof. Likewise, an alignment bearing may be disposed intermediate the rotor so as to maintain clearance between the rotor and adjacent stator.

The distance between opposing rotors and stators can vary or be uniform throughout. Preferably, the distance between and adjacent rotor and stator is about 0.1 to about 2 millimeters, with about 0.5 to about 1.5 mm more preferred, with about 0.75 to about 1.25 even more preferred, and with less than about 1 mm especially preferred. A magnetorheological fluid 28 is disposed within in the space formed by the alternating rotors 20 and stators 22. It has been found that the preferred distances provide a relatively large force thorough shearing in the on-state.

In a preferred embodiment, every other stator 22 includes a permanent magnet or an electromagnet capable of providing perpendicularly oriented magnetic fields 30 with respect to the stator 22, wherein the magnetic fields 30 are sufficient to change the yield stress properties of the MR fluid in the spaces about the adjacent rotor 20. In this manner, the yield stress of the MR fluid 28 can be fixed as in the case of a permanent magnet or varied as in the case of an electromagnet. The electromagnetic stator 22 generally comprises a coil of wire wrapped about the stator, wherein a magnetic field 30 is generated by passing a current through the wire. In a preferred embodiment, the coil is wrapped about a central portion of the stator as shown. The current may be alternating or direct. Moreover, the various electromagnetic stators can be connected serially or in parallel depending on the desired configuration or application.

The number of rotors and plates will depend on the desired application. Generally, the interfacial shearing area increases as the number of rotors and stators are increased. Preferably, the number of stators is equal to (n) and the number of rotors is equal to (n+1), wherein n is an integer greater than or equal to 1. In this manner, rotors 20 are preferably disposed at each end of shaft 12 to provide the maximum amount of interfacial shearing during an on-state.

During operation, an applied axial force to the threaded shaft causes the rotors to rotate and thus causes shearing of the MR fluid in the spaces defined by the rotor 20 and an adjacent stationary stator 22. In this manner, the stroking force can be variably controlled as in the case of an electromagnet by altering the current. In the on-state, an increased turn-up ratio results as well as higher damping capabilities are advantageously provided.

Figure 2:
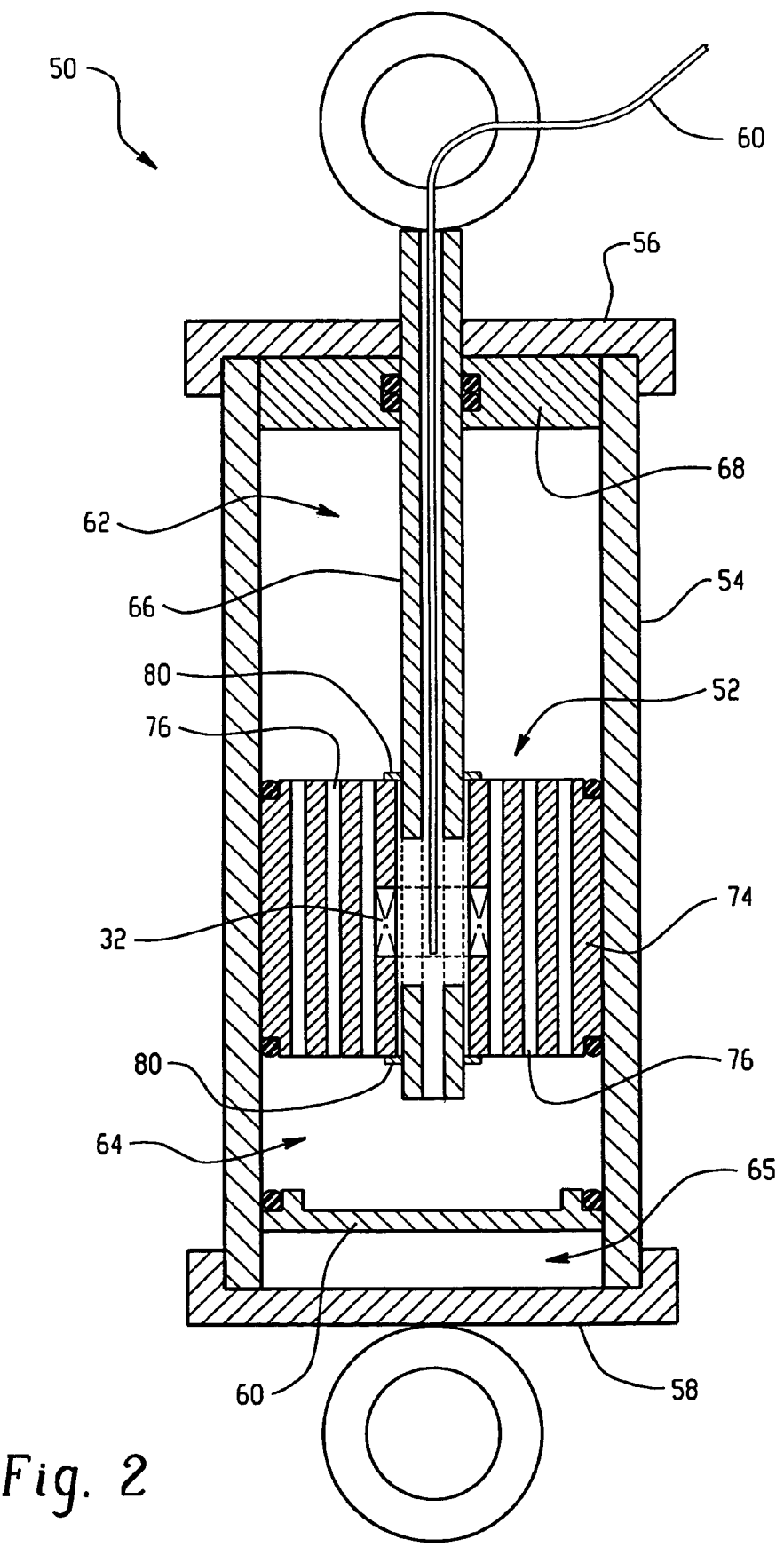
FIG. 2 is a cross sectional view of a magnetorheological damper in accordance with a second embodiment.

FIG. 2 illustrates a cross sectional view of a magnetorheological damper in accordance with a second embodiment. The MR fluid damper 50 includes a piston assembly generally designated 52 that is slidably engageable within a cylindrically shaped housing 54. The cylindrically shaped housing 54 is sealed at both ends with end caps 56, 58. In this manner, the piston assembly 52 defines a first chamber 62 and a second chamber 64, which are both filled with an MR fluid. A floating piston 60 is disposed within the housing 54 proximate to end cap 58. A third chamber 65, defined by the floating piston 60 and the housing end 58, is filled with an inert gas. As such, the third chamber 65 is separated from the MR fluid. The floating piston 60 and inert gas therein accommodate the varying rod volume during movement of the piston assembly 52.

The piston assembly 52 is attached to a hollow rod 66 that slides within a sealed bearing 68 disposed adjacent to end cap 56. A wire 60 is disposed within an interior region provided by the hollow rod 66. One end of wire 70 is in electrical communication with a coil 72 within the piston assembly 52. The coil 72 is capable of carrying a variable current to generate a magnetic field having a variable and controllable magnetic flux density depending on the magnitude of the current. In this manner, the viscosity and shear properties of the MR fluid disposed within the piston assembly 52 can be controlled. Alternatively, a permanent magent can be employed for MR dampers desired a fixed magnetic field. The other end of the wire is in electrical communication with a power supply (not shown) for supplying the current to the coil 72, which can be alternating current or direct current depending on the desired application.

Figure 3:
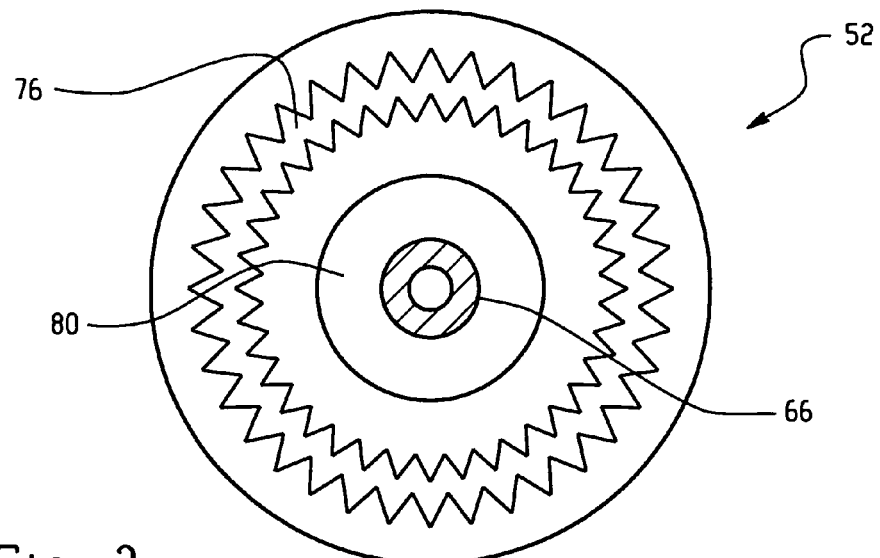
FIG. 3 is an end view of the piston assembly of the MR damper FIG. 2 in accordance with one embodiment.

A piston bearing 74 is mounted on an annular surface of the piston assembly 52 for permitting smooth sliding contact along a wall of the cylindrically shaped housing 54 while creating a fluidic seal between the first chamber 62 and the second chamber 64. The piston assembly 52 further includes an annular starburst shaped flow channel 76 extending through the piston assembly 52 so as to permit fluid communication of the MR fluid between the first and second chambers 62, 64, respectively. Shown more clearly in FIG. 3, the annular starburst shaped flow channel 76 has a generally jagged shaped cross section, thereby providing the capability of a significantly greater cross sectional surface area than in previous designs. The cross sectional area provided by the annular starburst flow channel 76 generally depends on the desired application. In order to maximize the turn-up ratio, it is preferred that the cross sectional area provided by the annular star burst flow channel 76 represent at least about 30 percent of the available cross sectional area of the piston assembly 52, with greater than about 40 percent more preferred, and with greater than 50 percent even more preferred (the theoretical upper limit being about 78 percent). In practical use, this can probably be no more than 60 percent as the cell walls require a sufficient thickness, i.e., yield strength, to withstand applied loads. The increase in volume provided by the annular starburst flow channel 76 increases the shear interface value, thereby enhancing the stroking force.

The annular star burst flow channel 76 can be formed with annular rings, each ring stackedly arranged and aligned so as to form the annular star burst flow channel 76. The rings can be locked in place by means of the end caps. The cross sectional diameter of the cylindrically shaped bores 76 can be the same or different. Preferably, the annular rings that define the star burst flow channel 76 is of a rigid non-magnetic material such as a plastic, stainless steel, aluminum, nickel, and the like.

The piston assembly 52 may further comprise end plates 80 at each end, which are preferably sized to cover the respective end face of piston core 72, without hindering fluid flow through the annular star burst flow channel 76. The end plates 80 also function to maximize the magnetic field in the annular star burst flow channel 76 by minimizing flux leakage and thereby increasing the initial on-state force by functioning as a magnetic isolation barrier between the piston core 72 and both rod 66 and cylinder 54. As such, end plates 80 are preferably formed from a rigid non-magnetic material.

Figure 4:
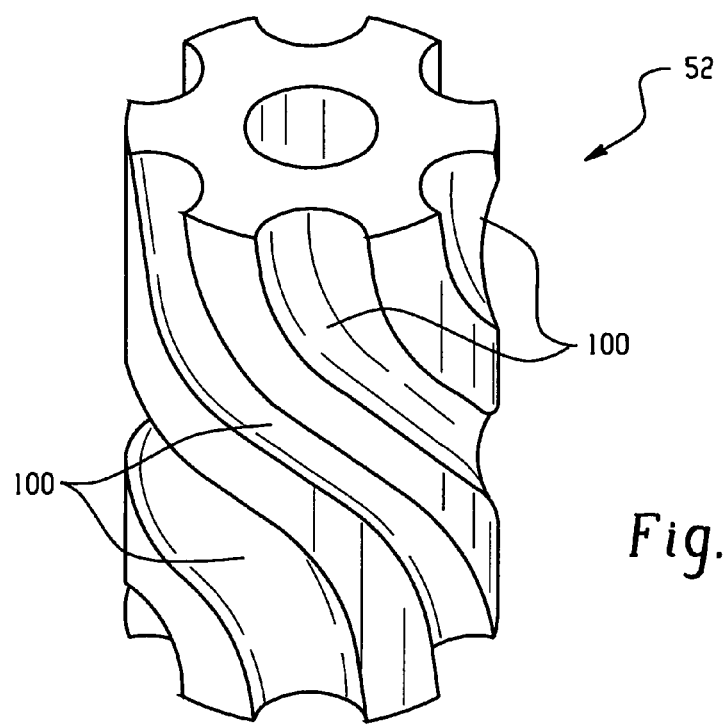
FIG. 4 is a perspective view of the piston assembly of the MR damper FIG. 2 in accordance with another embodiment.

FIG. 4 illustrates the piston assembly in accordance with another embodiment. In this embodiment, the piston assembly comprises a plurality of spiral shaped openings 100, i.e., volute shaped openings, one of which is shown by the dotted line structure. As before, the plurality of spiral shaped openings 100 advantageously increases the cross sectional open area so as to maximize the turn-up ratio. By use of a spiral shaped opening, greater amounts of magnetorheological fluid can be exposed to magnetic field. Other suitable slot geometries that would increase the area of fluid in shear even further would extend more deeply into the shaft towards its center and have cross sections in the horizontal plane that were shaped variously more like half ellipses, parabolas, rectangles or rhombuses.

Suitable MR fluid materials include, but are not intended to be limited to, ferromagnetic or paramagnetic particles or particulates dispersed in a carrier fluid. Suitable paramagnetic particles or particulates include compounds comprising oxides, chlorides, sulfates, sulfides, hydrates, and other organic or inorganic compounds of cerium, chromium, cobalt, dysprosium, erbium, europium, gadolinium, holmium, iron, manganese, neodymium, nickel, praesodymium, samarium, terbium, titanium, uranium, vanadium, and yttrium. Preferred particulates include alloys of iron, nickel, manganese, and cobalt, with or without other non-magnetic elements; alloys of iron, nickel, manganese, and cobalt with gadolinium; and the like, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron. In a preferred embodiment, the magnetorheological fluid includes a mixture of carbonyl iron and zinc oxide, silicon dioxide, molybdenum sulfide, or boron nitride, or a combination comprising at least one of the foregoing inorganic materials with the carbonyl iron.

The particle size should be selected so that the particles exhibit multi-domain characteristics when subjected to the magnetic field. Diameter sizes for the particles can be less than or equal to about 1,000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometer especially preferred. The particles are preferably present in an amount of about 5 to about 75 percent by volume of the total composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component is preferably less than or equal to about 100,000 centipoise, with less than or equal to about 10,000 centipoise more preferred, and less than or equal to about 1,000 centipoise even more preferred. Also preferred is a viscosity of greater than or equal to about 1 centipoise, with greater than or equal to about 250 centipoise more preferred, and greater than or equal to about 500 centipoise especially preferred.

Aqueous carrier fluids may also be used, especially those comprising hydrophilic mineral clays such as bentonite and hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the MR fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tristearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoro-aliphatic polymeric esters, and titanate, aluminate and zirconate coupling agents and the like. Polyalkylene diols, such as polyethylene glycol, and partially esterified polyols can also be included.

The preferred particulates are nanoparticles. Suitable diameter sizes for the particulates can be less than or equal to about 500 nanometers, with less than or equal to about 250 nanometers preferred, and less than or equal to about 100 nanometers more preferred. Also preferred is a particulate diameter of greater than or equal to about 1.0 nanometer, with greater than or equal to about 10 nanometers more preferred, and greater than or equal to about 50 nanometers especially preferred. The particulates preferably have an aspect ratio of about 0.25 to about 4, where the aspect ratio is defined as the ratio of the length to the equivalent circular diameter. The particulates are preferably present in an amount between about 5 to about 50 percent by volume of the total MR composition. Alternatively, the particles can be larger, e.g., micron sized particles, to be effective in altering the modulus properties of the material in a magnetic field. However, the nanometer-sized particles are more preferred because the modulus properties can be more readily tailored by the choice of particle size, particle size distribution and particle concentration when the nanometer-sized particles are used.

Suitable magnetic field strengths generated by the electromagnet or alternatively, the permanent magnet may range from greater than about 0 to about 1 Tesla (T).

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. A screw-type magnetorheological damper, comprising:
   a thrust shaft comprising an external threaded surface in threaded communication with a sealed housing, wherein at least one end of the thrust shaft extends from the housing;
   at least one rotor disposed in the housing comprising a planar surface with a centrally located aperture, wherein the at least one rotor is in direct contact and rotatably engaged with the threaded surface of the thrust shaft;
   at least one stator spaced apart from and adjacent to the at least one rotor, wherein the at least one stator is fixedly attached to the housing and comprises a centrally located aperture dimensioned to accommodate vertical movement of the thrust shaft and a planar surface substantially parallel to the planar surface of the at least one rotor;
   at least one alignment bearing disposed on a free end of the planar surface of the at least one rotor to maintain a clearance between the at least one rotor and the at least on stator and to carry a thrust load;
   a magnetorheological fluid disposed in a space defined by the at least one rotor and the at least one stator; and
   means for applying a substantially perpendicular magnetic field to the magnetorheological fluid relative to the planar surface of the at least one stator.

2. The screw type magnetorheological damper of claim 1, wherein the means for applying a substantially perpendicular magnetic field comprises a coil of wire about the at least one stator and a power source in electrical communication within the coil.

3. The screw type magnetorheological damper of claim 1 wherein the means for applying a substantially perpendicular magnetic field comprises a permanent magnet formed in the stator.

4. The screw type magnetorheological damper of claim 3, wherein the particles are in an amount of about 5 to about 75 percent by volume of the magnetorheological fluid.

5. The screw type magnetorheological damper of claim 1, wherein the at least one rotor and the at least one stator are alternatingly arranged in the housing.

6. The screw type magnetorheological damper of claim 1, wherein the magnetorheological fluid comprises carbonyl iron and an inorganic material selected from the group consisting of zinc oxide, silicon dioxide, molybdenum sulfide, and boron nitride.

7. The screw type magnetorheological damper of claim 1, wherein the magnetorheological fluid comprises ferromagnetic or paramagnetic particles or particulates dispersed in a carrier fluid.

8. The screw type magnetorheological damper of claim 1, wherein the means for applying a magnetic field comprises a permanent magnet or an electromagnet.

9. The screw type magnetorheological damper of claim 1, wherein the at least one stator spaced apart from and adjacent to the at least one rotor is at a distance of about 0.1 to about 2 millimeters.

10. The screw type magnetorheological damper of claim 1, wherein the at least one stator spaced apart from and adjacent to the at least one rotor is at a distance less than about 2 millimeters.

11. A screw-type magnetorheological damper, comprising:
- a thrust shaft comprising an external threaded surface in threaded communication with a sealed housing, wherein at least one end of the thrust shaft extends from the housing;
- a plurality of rotors and stators alternatingly arranged in the housing, wherein each of the plurality of rotors comprise a planar surface with a centrally located aperture, wherein each of the plurality of rotors is in direct contact with and rotatably engaged with the threaded surface of the thrust shaft, wherein each of the plurality of stators is fixedly attached to the housing and comprises a centrally located aperture dimensioned to accommodate vertical movement of the thrust shaft and a planar surface substantially parallel to the planar surface of the plurality of rotors, and wherein alternating stators comprise a permanent magnet or an electromagnet;
- at least one alignment bearing disposed on a free end of the planar surface of each of the plurality of rotors to maintain clearances between each of the plurality of rotors and each of the plurality of stators and to carry thrust loads; and
- a magnetorheological fluid disposed in a space defined by the plurality of rotors and stators.

12. The screw-type magnetorheological damper of claim 11, wherein the pluralities of rotors and stators comprises (n) stators and (n+1) rotors, wherein is an integer.

13. The screw type magnetorheological damper of claim 11, wherein the magnetorheological fluid comprises carbonyl iron and an inorganic material selected from the group consisting of zinc oxide, silicon dioxide, molybdenum sulfide, and boron nitride.

14. The screw type magnetorheological damper of claim 11, wherein the magnetorheological fluid comprises ferromagnetic or paramagnetic particles or particulates dispersed in a carrier fluid.

15. The screw type magnetorheological damper of claim 11, wherein the means for applying a magnetic field comprises a permanent magnet or an electromagnet.

16. The screw type magnetorheological damper of claim 11, wherein the particles are in an amount of about 5 to about 75 percent by volume of the magnetorheological fluid.

17. The screw type magnetorheological damper of claim 11, wherein the plurality of rotors and stators alternatingly arranged in the housing are spaced apart at a distance of about 0.1 to about 2 millimeters.

18. The screw type magnetorheological damper of claim 11, wherein the plurality of rotors and stators alternatingly arranged in the housing are spaced apart at a distance less than about 2 millimeters.

19. A process for operating a screw-type magnetorheological damper for variably converting a linear force to a rotary force, comprising:
- axially applying a force to a thrust shaft of a screw-type magnetorheological damper, wherein the screw-type magnetorheological damper comprises the thrust shaft having an external threaded surface in threaded communication with a sealed housing, at least one rotor disposed in the sealed housing comprising a planar surface with a centrally located aperture, wherein the at least one rotor is in direct contact and rotatably engaged with the threaded surface of the thrust shaft, at least one stator spaced apart from and adjacent to the at least one rotor, wherein the at least one stator is fixedly attached to the housing and comprises a centrally located aperture dimensioned to accommodate vertical movement of the thrust shaft and a planar surface substantially parallel to the planar surface of the at least one rotor, and wherein at least one alignment bearing is disposed on the free end of the at least one rotor to maintain a clearance between the at least one rotor and the at least one stator and to carry a thrust load, and a magnetorheological fluid disposed in a space defined by the at least one rotor and the at least one stator; and
- variably applying a substantially perpendicular magnetic field to the magnetorheological fluid relative to the planar surface of the at least one stator so as to variably covert the linear force applied to the thrust shaft into the rotary force.

* * * * *